United States Patent [19]

Shimizu et al.

[11] Patent Number: 4,588,134

[45] Date of Patent: May 13, 1986

[54] METHOD OF TREATING POLLEN FOR PULVERIZATION THEREOF AND EXTRACTION OF ESSENCE THEREFROM

[75] Inventors: Shinichi Shimizu, Kounosu; Tetuo Rikiishi, Kasukabe; Yasuo Koyama, Kounosu, all of Japan

[73] Assignee: Saitama Bee-Keeping Co., Ltd., Kounosu, Japan

[21] Appl. No.: 632,155

[22] Filed: Jul. 18, 1984

[30] Foreign Application Priority Data

Jul. 18, 1983 [JP] Japan ................................. 58-129346

[51] Int. Cl.⁴ ............................................ B02C 19/12
[52] U.S. Cl. ........................................ 241/21; 241/23; 241/24; 241/DIG. 37; 426/518
[58] Field of Search ............. 241/23, 24, 30, DIG. 37, 241/21; 426/518; 99/472

[56] References Cited

U.S. PATENT DOCUMENTS 1,979,124 10/1934 Tival .......................... 241/DIG. 37
3,172,546 3/1965 Schreiner .................... 241/DIG. 37

FOREIGN PATENT DOCUMENTS 31067 4/1979 Japan .

*Primary Examiner*—Mark Rosenbaum
*Attorney, Agent, or Firm*—Armstrong, Nikaido, Marmelstein & Kubovcik

[57] ABSTRACT

A process for treating pollen which comprises freezing said pollen grains by immersing in low temperature liquefied gas so as to make them low temperature brittle, and pulverizing said pollen grains while they are still in the low temperature brittle state by means of a pulverizer of impact type, or further adding aqueous ethanol solution as the solvent to the pollen grains treated in the above manner, and after extracting the effective ingredients of said pollen grains at room to elevated temperatures with stirring, removing the residue and then concentrating the clear extract thus obtained under vacuum.

4 Claims, No Drawings

METHOD OF TREATING POLLEN FOR PULVERIZATION THEREOF AND EXTRACTION OF ESSENCE THEREFROM

FIELD OF THE INVENTION

This invention relates to a method of treating pollen for pulverization thereof as well as for efficient extraction of essence therefrom for the purpose of fully utilizing pollen grains as food and food material without detracting from their characteristic flavor and aroma.

BACKGROUND OF THE INVENTION

It has been brought to light that in general, pollen grains, though varying depending on the kind or the growing environment, etc. of the flowers, contain abundantly a number of effective ingredients that are indispensable to the life maintenance of living bodies such as proteins, sugars, vitamins, minerals, various amino acids, etc. Recently, therefore, these pollen grains are being utilized as the highly nutritious natural foods containing well-balanced nutrients, and the method of processing also gradually changed to those which can provide safer foods and are more advantageous. Commercially, a number of marketable articles have appeared before the foot lights by utilizing the pollen grains or "pollen load" (i.e., pollen grains made into the form of small balls by honey-bees when they carry the pollen grains to their nest) processed into a variety of forms such as powder, granules, particles, etc, as cosmetics, foods, etc.

The formation of pollen takes place in such a manner that the pollen-mother-cell first formed in the anther of a flower forms four cells, i.e., pollen tetrad by a process of reduction division, and then each cell of the pollen tetrad individually grows storing up reserves such as starch. Said anther is full of a liquid, and it is said that the nutiritious ingredients in the pollen are formed in this liquid. It is also known that when the pollen begins to be formed, the adjacent cells in the pollen-mother-cell are partitioned by a cell membrane formed of lipoprotein, etc., but onto the outside of said cell membrane sporopollenin or the like substance and onto the inside of said cell membrane pectin or the like substance gradually adhere and form the outer and inner walls. As said inner wall is equivalent to the cell membrane of the ordinary cell, it follows that the pollen is enveloped not only with the cell wall but also with one more outer wall. The pollen thus enveloped with mantle membrane consisting of these inner and outer walls puts on oily substance or coloring matter, etc. around itself before the flowering and comes out from the flower at the time of flowering. The outer wall of said pollen also contains lignin in addition to the above described sporopollenin, the inner wall which forms the cell wall contains cellulose in addition to the above described pectin, the cell membrane contains lipids and proteins, and the interior of the cell wall contains abundantly a great many effective ingredients such as starch grains, lipid particles, etc.

However, the sporopollenin which is found in the outer wall of said pollen is so tough and stable a substance that it is very difficult to decompose even by acid, alkali, or enzyme, and as said pollen is a highly active living body which can stand the changes in its chemical and physical environments to such an extent that said pollen is considerably resistant to heat, and stable enough to remain unchanged when immersed in an organic solvent such as ether, alcohol, etc., or can extend its pollen tube even under the irradiation with radiant rays, a serious problem arises as follows. That is, even if said pollen could be incorporated as such into any foodstuff, it is either eliminated without any decomposition or only slightly decomposed through the germ pore of the pollen, so that the greater part of the effective ingredients can be neither digested nor absorbed.

In an attempt to overcome the above described problem a process wherein pollen is germinated in an artificial culture using cane sugar solution, etc., or pollen is triturated in a mortar after it has been subjected to enzyme treatment was devised, but in the former process it is almost infeasible for the following reasons. That is, since the properties of pollen greatly differ depending on the kind of the plant, in some cases no pollen can be germinated absolutely in an artificial culture, and since the optimum concentration of cane sugar is also quite specific to the pollen, not only does it happen that when said concentration is either too high or too low no pollen is germinated, but also the time required for the pollen to be germinated is so much widely different that it varies from 2 minutes in garden balsam to 20 hours in Japanese red pine. On the other hand, in the latter case, although the trituration can be achieved to the extent of about 50% complete, there is a defect that the operation requires a long period of time.

In order to overcome the above described problems hitherto known the present applicant provided "a process for extracting contents from pollen grains by crushing the cell membrane of said pollen grains which comprises keeping pollen grains irrespective of the kind thereof for more than 24 hours in a freezer at −20° C., and then putting said pollen grains into a mixer bowl while rapidly pouring hot water at 90°–100° C. on said pollen grains in a proportion of hot water:pollen=200 ml:5 g, followed by stirring" [Japanese Patent No. 1002326 (Japanese Patent Publication No. 31067/1979)], but in this process it was intended to extract contents from pollen grains by crushing the cell membrane, but not the mantle membrane of the pollen grains, so that the complete extraction of contents could be hardly achieved, and moreover, because of the hot water being used there was a fear of destroying the thermolabile ingredients among the effective ingredients of the pollen grains.

SUMMARY OF THE INVENTION

Thus the present invention was achieved in view of the above described problems, and the object is to provide a process for treating pollen which can completely expose the contents without destroying any of the effective ingredients in said pollen grains.

DETAILED DESCRIPTION OF THE PREFERRED EMBODIMENT OF THE INVENTION

In accordance with the process of this invention pollen grains are frozen by immersing in low temperature liquefied gas, such as liquid nitrogen, so that said pollen grains may become fragile owing to low temperature brittleness, and in such a state said pollen grains together with the mantle membrane are pulverized by means of an impact pulverizer.

As for the pulverization of pollen grains which is carried out when the ingredients in said pollen grains are utilized as food, it may be mentioned that the pulverization means the broadening of the covering area in the utilization form of the ingredients as above described, and thus the method of utilization may be broadly divided into two categories, i.e., the one is the case where the pulverized product is added as such directly to the food, and the other is the case where the essence is extracted from the pulverized product and indirectly used in processing. Further, from the standpoint of the form of the pollen-added food they are quite diverse involving the case of solid cream-like food, the case of solid food, the case of liquid drinking food, etc. When the ingredients in the pollen grains pulverized in accordance with the process of this invention are extracted as the essence and utilized in food, the pulverization treatment is greatly meritorious in the extraction of the ingredients. Namely, it may be stated definitely that the extraction efficiency is largely affected by the treatment. In this connection, it will also be important to pay much attention to the importance of the extraction treatment itself following the foregoing pulverization treatment. For instance, the specific character having foods as the subject, the improvement in the extraction efficiency, the economical method of extraction, the simplicity in the preparation step, etc. are the factors to be considered. As the method of extraction from natural substances the treatment with hot water, organic solvents such as alcohol, ether, etc., inorganic or organic acids as well as alkali were generally the first consideration, but as described above, in the case of pollen grains putrefaction occurred during the extraction with hot water, alcohol, or organic acid, so that the coloring matter, flavor and aroma characteristic to the pollen were damaged and there was a fear of losing the value as food. Thus, the present inventors made an elaborate investigation noticing that the extraction should be made from the pulverized product of the pollen grains, but not directly from the pollen grains, and as the result there was discovered a process for treating pollen grains so that the ingredients in said pollen grains can be extracted as essence in an easy and simple way and moreover, economically in an efficient way without damaging the coloring matter, flavor and aroma of said pollen grains.

In order to extract the pollen essence in accordance with this invention, to the pollen grains which were beforehand pulverized is added 6-10 times the weight of said pulverized pollen grains of ethanol solution, and after extracting the effective ingredients under stirring for 1-3 hours at a liquid temperature of 50°-60° C., the extract obtained is separated into clear extract and residue by filtration or centrifuging, and then said clear extract is concentrated to Bx. 35°-60° under a vacuum of about 10-50 mm Hg at 40°-50° C. using a vacuum concentrator.

With reference to examples this invention will be explained more fully.

EXAMPLE 1

First, a stainless steel vessel of a suitable size (having a capacity of 10-15 l) used for immersion was filled about two thirds full of liquid nitrogen refrigerant which is an inert substance and one of the low temperature liquefied gases. Next, into said vessel containing liquid nitrogen there was quietly introduced little by little the pollen grains to be pulverized, which were frozen by 60-90 seconds of immersion until low temperature brittleness occurred. Then the low temperature brittle pollen grains were scooped up by means of a scoop-like instrument and pulverized in a hammer mill, which was operated at 14,000 rpm, using a screen with openings of 0.3 m/m for fine pulverizer. In this way there was obtained a very fine pulverized product of pollen, of which the content material was completely laid bare. If a hammer mill is operated at 8,000 rpm or higher, the desired fine pulverized product can be obtained. As the pulverizer use can be made of any conventional impact pulverizer, besides the hammer mill.

In this example the freezing and the pulverization of the pollen grains to be pulverized were carried out separately, but if continuous mass production is desired, an industrial low temperature pulverizer can better be used.

EXAMPLE 2

To 5 kg of pulverized product of pollen obtained in Example 1 was added 50 kg of 20% ethanol solution, and after the effective ingredients had been extracted for 3 hours at a liquid temperature of 60° C. with stirring, the extract was separated into clear extract and residue in a centrifuge, which was operated for 30 minutes at 5,000 rpm. Then, the clear extract was transferred to a vacuum concentrator, wherein alcohol and the like were removed at 50° C. under a vacuum of 30 mm Hg, and concentration was continued until Bx. 35°. In this was, there was obtained 7.5 kg of pollen essence in the form of a viscous syrup, which had pale amber color, and flavor and aroma characteristic to the original pollen grains.

EXAMPLE 3

To 5 kg of pulverized product of pollen obtained in Example 1 was added 50 kg of 5% ethanol solution, followed by the addition of 2.5 kg of 10% vinegar, which made the vinegar concentration in the whole mixture 0.5%. After the effective ingredients had been extracted for 2 hours at a liquid temperature of 50° C. with stirring, said extract was separated into clear extract and residue in a centrifuge, which was operated for 30 minutes at 5,000 rpm. Then, the clear extract was transferred to another vessel, while the residue was further treated with 30 kg of 5% ethanol solution, and after the effective ingredients had been extracted again for one hour at 60° C. with stirring, said extract was separated into clear extract and residue in a centrifuge, which was operated under the same conditions as above. This clear extract and the earlier obtained clear extract were transferred to a vacuum concentrator, wherein alcohol, etc. were removed at 40° C. under a vacuum of 30 mm Hg, and concentration was continued until Bx. 35°. In this way there was obtained 10 kg of pollen essence in the form of viscous syrup.

In Example 3 vinegar was added as an additional solvent in the first extraction, so that the separative effect was improved as well as the antiseptic effect was enhanced by the lowering of pH. Moreover, in Example 3, as the extraction with stirring was carried out twice, the extraction efficiency could be improved as compared with that in Example 2.

In addition, in the above described Examples 2 and 3 the concentration (hardness) of the finished product was brought to Bx. 35°, but as no such limitation is necessary any concentration may be chosen as well depending on the use purpose of said pollen essence. Accordingly, the degree of vacuum as well as the liquid temperature of the vacuum concentrator also should be chosen suitably as the case may be.

As above described, in accordance with this invention since the pollen grains enveloped with chemically extremely stable mantle membrane are made low temperature brittle by being frozen so that said mantle membrane can become fragile, they can be readily pulverized by means of a pulverizer. Thus, the effective ingredients can be completely laid bare, and also, by virtue of the pulverizer of impact type used, there is obtainable a non-cohesive, flowing pulverized product which is devoid of whiskers unlike the powder which was prepared by wrentching or by friction.

Furthermore, when pollen grains are pulverized at room temperature the composite oily material or the like within the pollen grains not only make the pulverization very difficult, owing to the occurrence of oil fusion, etc., but also are apt to cause the dissipation of the volatile material due to the heat evolution by pulverization or the deterioration or invalidation of the effective ingredients. In accordance with the invention, however, in which the pollen grains are made low temperature brittle, the pulverized product of pollen which is highly nutritious can be obtained rendering it possible to prevent the above described losses.

In particular, in accordance with this invention, in which the pollen essence is extracted from the pollen grains pulverized by special treatment as described above, the coloring matter or flavor and aroma of the pollen grains are not susceptible to decay when they are dissolved, decomposed or treated in any other way in or by hot water, alcohol, organic acid, etc. during the extraction, and thus the effective ingredients that can be utilized to food or the like can be extracted in high efficiency. From this it is obvious that such pollen essence is of wide utility in various products such as, for instance, honey or processed honey, medicines, cosmetics, etc.

What is claimed is:

1. A process for preparing an extraction product from pollen grains, which comprises:
   freezing said pollen grains by immersing said pollen grains in a low temperature liquefied gas, thereby making said pollen grains low temperature brittle,
   removing said pollen grains from said low temperature liquefied gas,
   pulverizing said pollen grains while said pollen grains are still low temperature brittle by means of a pulverizer of impact type,
   adding an aqueous ethanol solution, as a solvent, to said pulverized pollen grains, said aqueous ethanol solution being added in an amount 6–10 times the weight of said pulverized pollen grains,
   extracting effective ingredients of said pollen grains at room to elevated temperature for 1–3 hours with stirring,
   removing a residue of said pollen grains, and
   concentrating the resulting extract solution under vacuum until a clear, syrupy extraction product is obtained.

2. The process of claim 1, wherein said solvent also contains acetic acid, said acetic acid being added in an amount of 0.1–10 times the weight of said pulverized pollen grains.

3. The process of claim 1 or 2, wherein said residue is once more subjected to said extracting with said solvent.

4. The process of claim 1, wherein said concentrating is carried out at a liquid temperature of 40°–50° C. under a vacuum of 10–50 mm Hg until Bx. 35°–60° is attained.

* * * * *